(12) United States Patent
Cao et al.

(10) Patent No.: US 11,984,115 B2
(45) Date of Patent: May 14, 2024

(54) DIALOG SYSTEM CAPABLE OF SEMANTIC-UNDERSTANDING MAPPING BETWEEN USER INTENTS AND MACHINE SERVICES

(71) Applicant: Bayerische Motoren Werke Aktiengesellschaft, Munich (DE)

(72) Inventors: Yang Cao, Chicago, IL (US); Jilei Tian, Chicago, IL (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 61 days.

(21) Appl. No.: 17/053,621

(22) PCT Filed: May 7, 2018

(86) PCT No.: PCT/EP2018/061666
§ 371 (c)(1),
(2) Date: Nov. 6, 2020

(87) PCT Pub. No.: WO2019/214798
PCT Pub. Date: Nov. 14, 2019

(65) Prior Publication Data
US 2021/0249001 A1 Aug. 12, 2021

(51) Int. Cl.
*G10L 15/18* (2013.01)
*G06F 3/16* (2006.01)
(Continued)

(52) U.S. Cl.
CPC .......... *G10L 15/1822* (2013.01); *G06N 3/049* (2013.01); *G10L 15/16* (2013.01);
(Continued)

(58) Field of Classification Search
CPC ..... G10L 15/1822; G10L 15/16; G10L 15/26; G10L 2015/223; G10L 15/22; G06N 3/049; G06F 3/167
See application file for complete search history.

(56) References Cited

U.S. PATENT DOCUMENTS 9,587,955 B1* 3/2017 Boss .................. G01C 21/3641
9,607,283 B1* 3/2017 Adelson .................. G01S 19/46
(Continued)

FOREIGN PATENT DOCUMENTS

CN 107210033 A 9/2017
EP 3 396 665 A1 10/2018

OTHER PUBLICATIONS

International Search Report (PCT/ISA/210) issued in PCT Application No. PCT/EP2018/061666 dated Jan. 24, 2019 (three (3) pages).
(Continued)

*Primary Examiner* — Daniel C Washburn
*Assistant Examiner* — Athar N Pasha
(74) *Attorney, Agent, or Firm* — Crowell & Moring LLP

(57) ABSTRACT

A dialog system and intelligent personal assistant capable of semantic-understanding mapping between user intents and machine services includes an interface to receive a voice or text request from a user. Semantics of the request including at least one of entities, intent, or context are extracted from the user's request. A sequence of action features is selected based on the extracted semantics. A sequence of application programming interfaces (APIs) corresponding to the sequence of action features is then executed to generate a result. An action sequence optimizer may optimize the sequence of action features based on user configuration. The examples provide a technical solution to model a richer semantic-understanding mapping between user intents and available APIs, that will be greatly improving user experience in the spoken dialogue system, as core of personal assistant.

19 Claims, 5 Drawing Sheets

(51) Int. Cl.
*G06N 3/049* (2023.01)
*G10L 15/16* (2006.01)
*G10L 15/22* (2006.01)
*G10L 15/26* (2006.01)

(52) U.S. Cl.
CPC .............. *G10L 15/26* (2013.01); *G06F 3/167* (2013.01); *G10L 2015/223* (2013.01)

(56) References Cited

U.S. PATENT DOCUMENTS

| | | | | |
|---|---|---|---|---|
| 2015/0302301 | A1* | 10/2015 | Petersen | G06N 5/04 |
| | | | | 706/11 |
| 2016/0225370 | A1 | 8/2016 | Kannan et al. | |
| 2016/0231132 | A1* | 8/2016 | Maiwand | G01C 21/36 |
| 2016/0259623 | A1* | 9/2016 | Sumner | G06F 3/167 |
| 2016/0260433 | A1* | 9/2016 | Sumner | G06F 40/30 |
| 2017/0043731 | A1* | 2/2017 | Kim | H04L 67/12 |
| 2017/0359463 | A1 | 12/2017 | Segalis et al. | |
| 2019/0129938 | A1* | 5/2019 | Yao | H04L 12/282 |
| 2019/0147231 | A1* | 5/2019 | Kim | G06V 40/20 |
| | | | | 382/181 |
| 2019/0196796 | A1* | 6/2019 | Bahrami | G06F 8/38 |
| 2019/0318725 | A1* | 10/2019 | Le Roux | G10L 15/16 |
| 2020/0283014 | A1* | 9/2020 | Wray | B60W 60/001 |

OTHER PUBLICATIONS

Written Opinion (PCT/ISA/237) issued in PCT Application No. PCT/EP2018/061666 dated Jan. 24, 2019 (six (6) pages).

English-language Office Action issued in Chinese Application No. 201880081408.2 dated Feb. 22, 2023 (Nine (9) pages).

* cited by examiner

DIALOG SYSTEM CAPABLE OF SEMANTIC-UNDERSTANDING MAPPING BETWEEN USER INTENTS AND MACHINE SERVICES

FIELD

Examples relate to a dialog system, more particularly a dialog system and intelligent personal assistant (IPA) capable of semantic-understanding mapping between user intents and machine services.

BACKGROUND

Intelligent personal assistant (IPA) is becoming one of widely used applications and services. A spoken dialogue system intended to converse with a human plays as a key role in the IPA. FIG. 1 shows a conventional dialog system 100. A current dialogue system 100 uses natural language understanding (NLU) 102 to find a user intent through dialogue interaction. A dialog policy module 106 chooses a proper reaction according to a current dialog state. The spoken dialog system 100 requires a component 104 that can track what has happened in a dialog, incorporating system outputs, user speech, context from previous turns, and other external information. The output of the dialog state module 104 is then used by the dialog policy module 106 to decide what action the system should take next. The dialog state module 104 is essential for managing the state and the final performance of a complete system. If required information is incomplete, the system 100 will generate a sentence to ask for further information. If all information is ready, the system 100 will use a predefined action template for selecting a proper action 108, such as querying database, calling corresponding service application programming interfaces (APIs), and/or executing a control action.

A current dialogue system is able to simply handle the service with only one action, for example a query from database, one API call, or asking for more information from the user. In real-life cases, the user expects to communicate with the IPA as human, with richer semantics that may require several APIs for service composition.

Even though there are lots of available web service APIs, in the current dialogue system, for richer semantics in typical human natural communication, it has to ask for information step-by-step and it is very inconvenient. It would be impractical to exhaustively list all valid service API combinations for a large system, since the number of valid API combinations can be enormous. In NLU, the semantics are defined for human communication purpose, thus it is not optimal for communication and understanding by machine, e.g. API.

SUMMARY

Examples disclosed herein provide novel technical solutions to model richer semantic-understanding mapping between user intents and context and available machine services (e.g. APIs). The examples will greatly improve the user experience in a dialogue system such as a spoken dialog system, as a core of personal assistant applications. Examples also provide for a smart service composition, e.g. building a dialogue system, that can select multiple APIs as one response action.

The dialog system may receive via an interface a voice or text request from a user. Semantics of the request including at least one of entities, intent, or context may be extracted from the request. A sequence of action features may be selected based on the extracted semantics by using a recurrent neural network or any other machine learning system. The sequence of action features may be organized as a resource graph. A sequence of APIs corresponding to the sequence of action features may then be executed. An action sequence optimizer may optimize the sequence of action features based on user configuration.

The dialog system may further include an action sequence optimizer configured to optimize the sequence of action features based on user configuration. The request may be a voice request, and the interface may include a voice recognizer configured to convert a voice request to a text string. Additionally or alternatively, the request may be received as a text request. The sequence of action features may be organized as a resource graph. The API mapper may be implemented with a recurrent neural network. The recurrent neural network may be trained by converting speeches and responses into features, organizing features of the speeches and corresponding responses as an input sequence-to-target sequence pair, and performing supervised sequence-to-sequence training to train and optimize parameters of the recurrent neural network. Multiple APIs may be called in response to the request. The request may be received from a user device.

In accordance with another aspect, a method of implementing a dialog system is provided. The method includes receiving a request from a user, extracting semantics of the request including at least one of entities, intent, or context of the request, selecting a sequence of action features based on the extracted semantics, and executing a sequence of machine services corresponding to the sequence of action features. The method may include optimizing the sequence of action features based on user configuration. The request may be a voice request, and the voice request may be converted to a text string. The request may be received as a text request. The sequence of action features may be organized as a resource graph. The sequence of action features may be selected by a recurrent neural network. The recurrent neural network may be trained by converting speeches and responses into features, organizing features of the speeches and corresponding responses as an input sequence-to-target sequence pair, and performing supervised sequence-to-sequence training to train and optimize parameters of the recurrent neural network. Multiple application programming interfaces may be called in response to the request. The request may be received from a user device.

In accordance with still another aspect, a non-transitory machine-readable storage is provided. The machine-readable storage may include machine readable instructions, when executed, to implement any method disclosed herein.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
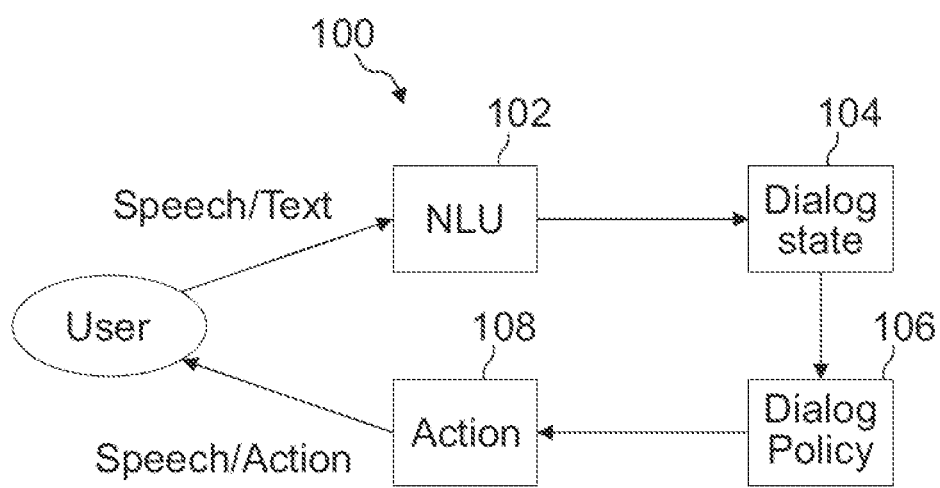
FIG. 1 shows a conventional dialog system.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples disclosed herein provide novel technical solutions to model richer semantic-understanding mapping between user intents and context and available machine services (e.g. APIs). The examples will greatly improve user experience in a dialogue system such as a spoken dialog system, as a core of personal assistant applications. As a general framework, the examples disclosed herein can be applied to any applications for mapping directly human semantics with machine services.

Examples also provide for a smart service composition, e.g. building a dialogue system, that can select multiple machine services (e.g. APIs) as one response action.

Figure 2:
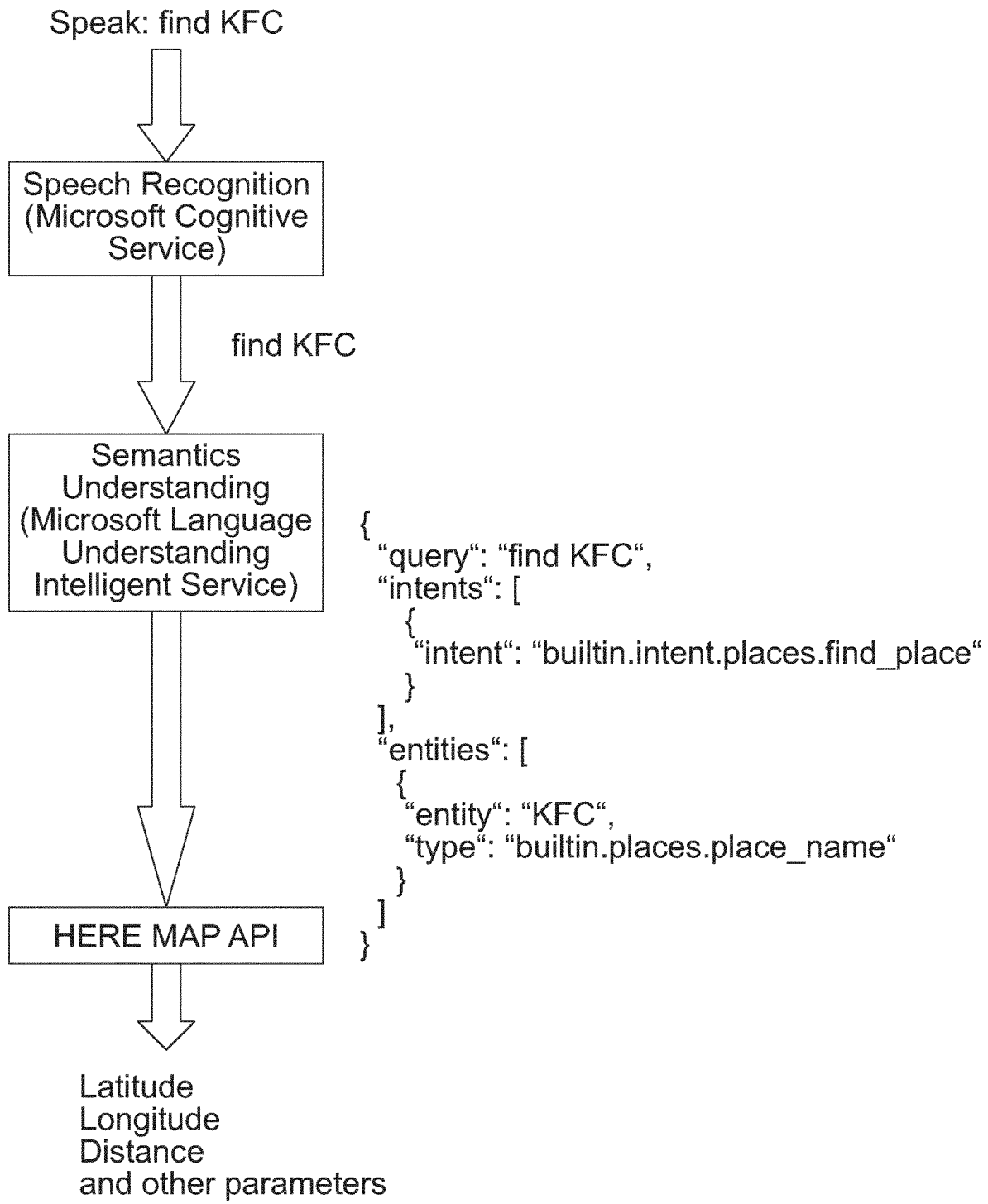
FIG. 2 shows an example process of semantic parsing from a user's voice input.

FIG. 2 shows an example process of semantic parsing from a user's voice input. A user makes a voice request (e.g. "find KFC"). A speech recognition module (e.g. Cognitive Service) converts the user's voice input to a text string. A semantics understanding module (e.g. Microsoft Language Understanding Intelligent Service (LUIS)) may parse the text string into human semantics, such as entity, intent, or the like. An API (e.g. HERE maps API, etc.) may be then called for generating an output. In this example, the latitude, longitude, distance, or other parameters of the location of the KFC may be output.

Conventionally, the semantics model is normally trained using a label (e.g. entity and intent) predefined by human based on the semantics. For dealing with service APIs/machine services based on the human semantics, the performance would be optimal if it is labeled with available service APIs/machine services directly. The mapping from human semantics to machine services can perform optimally if the system is trained directly with the available services. Furthermore, several APIs/machine services compositions may be commonly needed to accomplish the user's single request represented by natural human sentence or phrase. Once new service APIs/machine services are created or existing APIs/machine services are modified or removed, the model needs to be adaptively trained. Hereafter, the terms "API" and "machine services" will be used interchangeably.

In examples disclosed herein, the dialog system can be learnt and trained directly on API sequence selection, rather than labeled by human semantics definition.

In examples, APIs and actions may be organized as a graph, e.g. a resource description framework (RDF) graph, and multiple API calls may be encoded as features using the graph. Each API may be written in a Web Service Description Language (WSDL) Extensible Mark-up Language (XML) format including input parameters, output parameters, description, etc. The WSDL is an XML-based interface definition language that is used for describing the functionality offered by a web service. A response of confirmation or further question may be treated as a special API. One type of response may correspond to one API.

The RDF graph is built with nodes and edges (i.e. connections). In examples, in building an RDF graph, an API is a node and a connection (i.e. relationship) between APIs is defined. For example, a connection from "API i" to "API j" may be defined if one of the outputs of "API i" matches one of the inputs of "API j." Graph nodes may be added to represent different types of direct inputs from a user and not from results of any API call, (such as name entities, user ID, etc.), which may be treated as a special API. Each node in the graph is given a unique index. Inference rules are created. For example, for an API call to be valid, all the required input parameters need to be presented.

Feature extraction is needed to convert machine API call sequence to features that can be modelled by machine learning algorithm. During training stage, the mapping from the feature of human semantics to the feature of API call sequence is learnt. Feature extraction is performed in order to train the mapping from human semantics to machine API. For a single API call type, indexes of input parameters and index of the API call are extracted as feature. Multiple API calls are treated as a sequence of features of single API calls, i.e. features of a first API call, features of a second API call, . . . , the features of the last API call.

In reality, multiple actions may be needed for one reaction. For example, if a user asks the system "Navigate me to the store, so that I can buy milk on the way home," the system needs to know the address of home, and then find a route(s) to home, and then search for a store for milk on the found route(s), and then send a store address to the navigation system. All the above information can be obtained from various APIs. For example, the user's home address may be queried from an API that outputs an address based on a user ID (e.g. a user learnt destination API), a route to home may be queried from an API that outputs a routing information based on a given address (e.g. a personal route API), and a store along the route may be obtained from a place searching API (e.g. HERE Places API). The HERE Places API is an API that allows to build applications where users can search for places and received detailed information about selected places. A vehicle communication API may send the store location (e.g. remotely via cloud) to set the navigation in the vehicle. The term "vehicle" includes any type of equipment for transportation including, but not limited to, a car, a bus, a truck, a sport utility vehicle, a recreational vehicle, a boat, a motorcycle, or the like.

Figure 3:
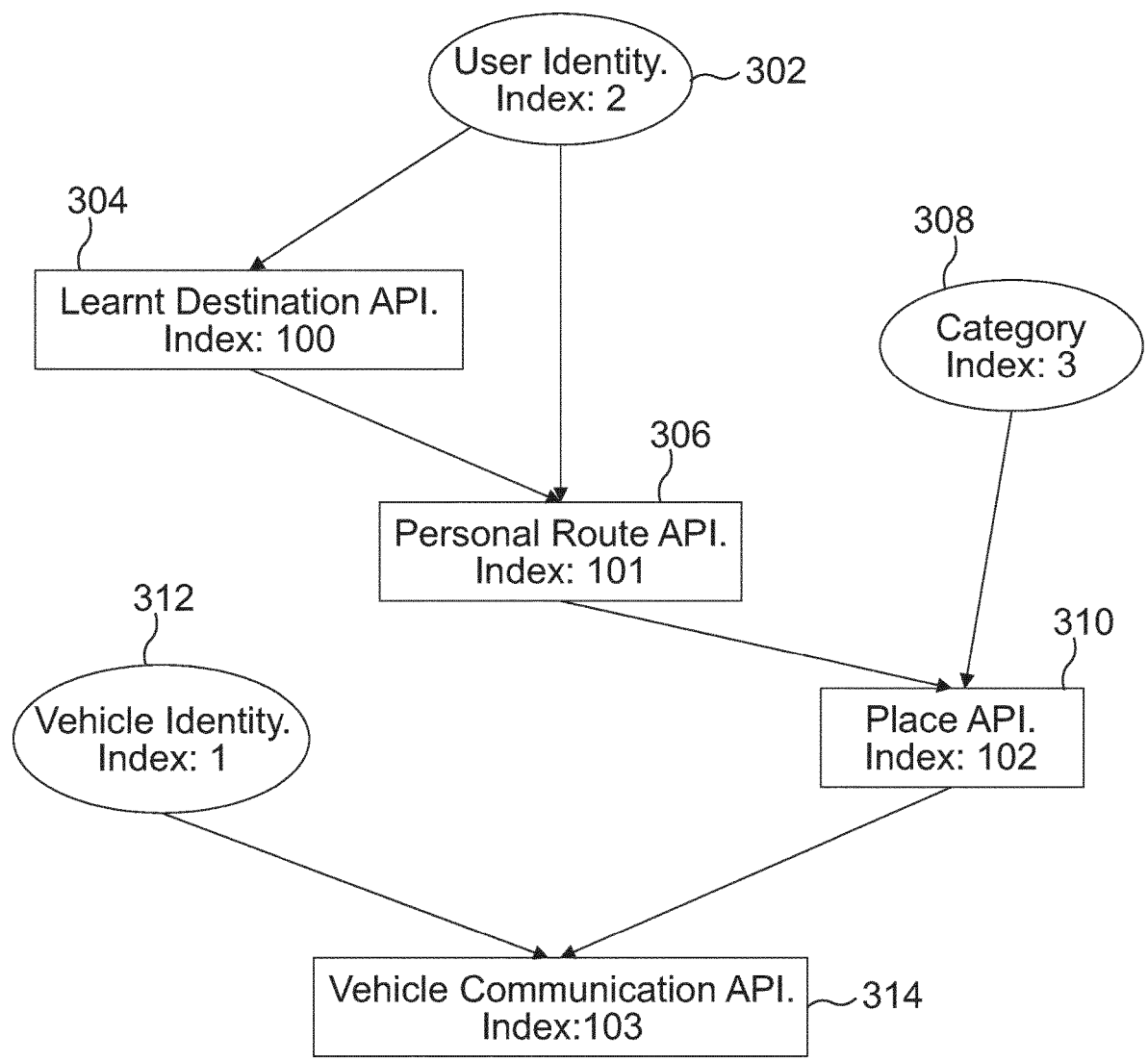
FIG. 3 shows an example of API graph and feature extraction in accordance with one aspect.

FIG. 3 shows an example of API graph and feature extraction in accordance with one aspect. For the example request above "Navigate me to the store, so that I can buy milk on the way home," the API call sequence may be as follows: Learnt Destination API→Personal Route API→Places API→Vehicle Communications API.

The User Identity API 302 may output a user ID for a given user. The Learnt Destination API 304 may output an address (e.g. a home address) of the given user ID. The Personal Route API 306 may output routing information for the address provided from the Learnt Destination API 304 (in this example, routing information for the home). The Category API 308 may output category information for an input (in this example, the category of the store to by milk, e.g. grocery). The Place API 310 may search for a place that belong to the category provided by the Category API 304 along the route provided by the Personal Route API 306 (in this example, the location information of the found store along the route to home). The Vehicle Identity API 312 may output a vehicle ID. The Vehicle Communication API 314 may send the location information provided by the Place API 310 to the vehicle provided by the Vehicle Identity API 312.

In this example, the mapped feature sequence may be: 2,100,2,101,3,102,1,103, i.e. (User identity)→(To learnt destination API)→(User identity, From learnt destination API)→(To personal route API)→(category, From personal route API)→(To place API)→(Vehicle Identity, From place API)→(To vehicle communication API).

Figure 4:
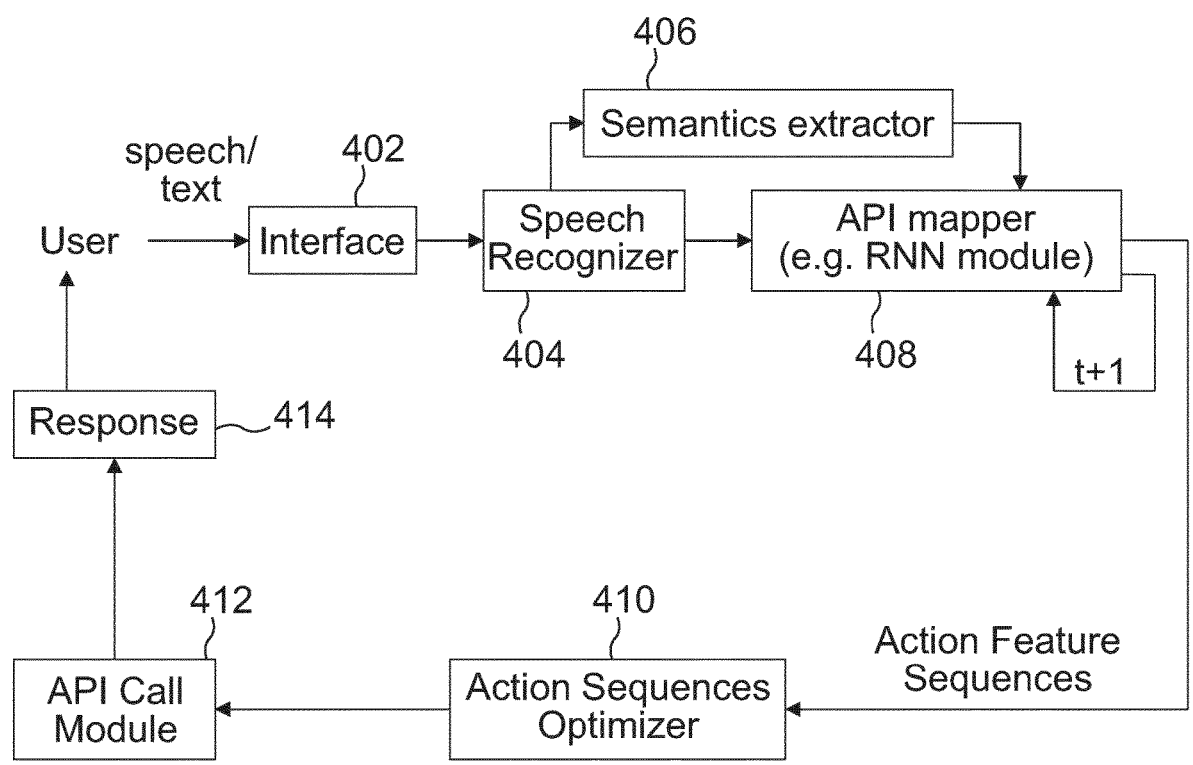
FIG. 4 is a block diagram of an example dialog system in accordance with one aspect.

FIG. 4 is a block diagram of an example dialog system 400 in accordance with one aspect. The system 400 includes an interface 402 to communicate with a user (e.g. by voice, text, etc.). A speech recognizer 404 converts user's speech to a text string. A user's request may be received by text (e.g. a text message, an email, etc.) A semantics extractor 406 extracts semantics of the user request (e.g. intent, context, entities of the request, etc.) from the text string. The outputs of the speech recognizer 402 and the semantics extractor 404 are text sequences which may be embedded into high dimension spaces. For example, the speech recognizer 402 may output speech embedding directly, which can be combined with text embedding as features. The embedding feature sequences are input of the API mapper 408. Embedding is the collective name for a set of language modeling and feature learning techniques in natural language processing where words or phrases from the vocabulary are mapped to vectors of real numbers that ease the algorithmic operation or computation.

An API mapper 408 (e.g. a recurrent neural networks (RNN) module, a reinforcement learning module, or any machine learning module) may be used to model the dialog policy selection based on the human semantics of the user's request. The output of the API mapper 408 is action feature sequences (e.g. the feature sequence in FIG. 3: (User identity)→(To learnt destination API)→(User identity, From learnt destination API)→(To personal route API)→(category, From personal route API)→(To place API)→(Vehicle Identity, From place API)→(To vehicle communication API)). Unlike feedforward neural networks, RNNs can use their internal state (memory) to process sequences of inputs that is suitable for learning objective, in this case the semantic mapping toward finding the optimal service sequence, with a variable length, to address user's need.

The action sequences optimizer 410 may use inference capacity of RDF graph to find missing parts of the feature sequence. For example, if some of the required inputs for an API call are missing, the action sequences optimizer 410 may find the missing inputs and make the sequence complete. The action sequences optimizer 410 may optimize the API call according to user configurations. For example, for one API, there may be several alternative APIs from other providers. The action sequences optimizer 410 may replace it with the lowest price or highest performance alternative according to the user configurations. The API call module 412 then executes a sequence of APIs to generate a response 414 to the user.

The dialog system 400 may be implemented in a user device (e.g. a mobile phone, a tablet, a wearable user device, a personal computer, a laptop, etc.) and the action may be sent to a target device (e.g. a vehicle) remotely over a network (i.e. cloud). Alternatively, the dialog system may be included in the target system (e.g. in a vehicle).

The components of the dialog system 400 may be trained for optimization. Data is collected for training. The training database should include sufficient samples that are labelled by multiple API call types. The data can be initially connected from manually labeled data, e.g. supervised or semi-supervised training.

The API mapper 408 may be trained by first converting all speech and responses into features as described above, and then organizing features of speech and corresponding response as an input sequence to target sequence pair. A supervised sequence-to-sequence training may then be applied to train and optimize the parameters of the API mapper 408 (e.g. RNN module). The training of the API mapper 408, e.g. RNN module, may be done by using any conventional techniques.

Figure 5:
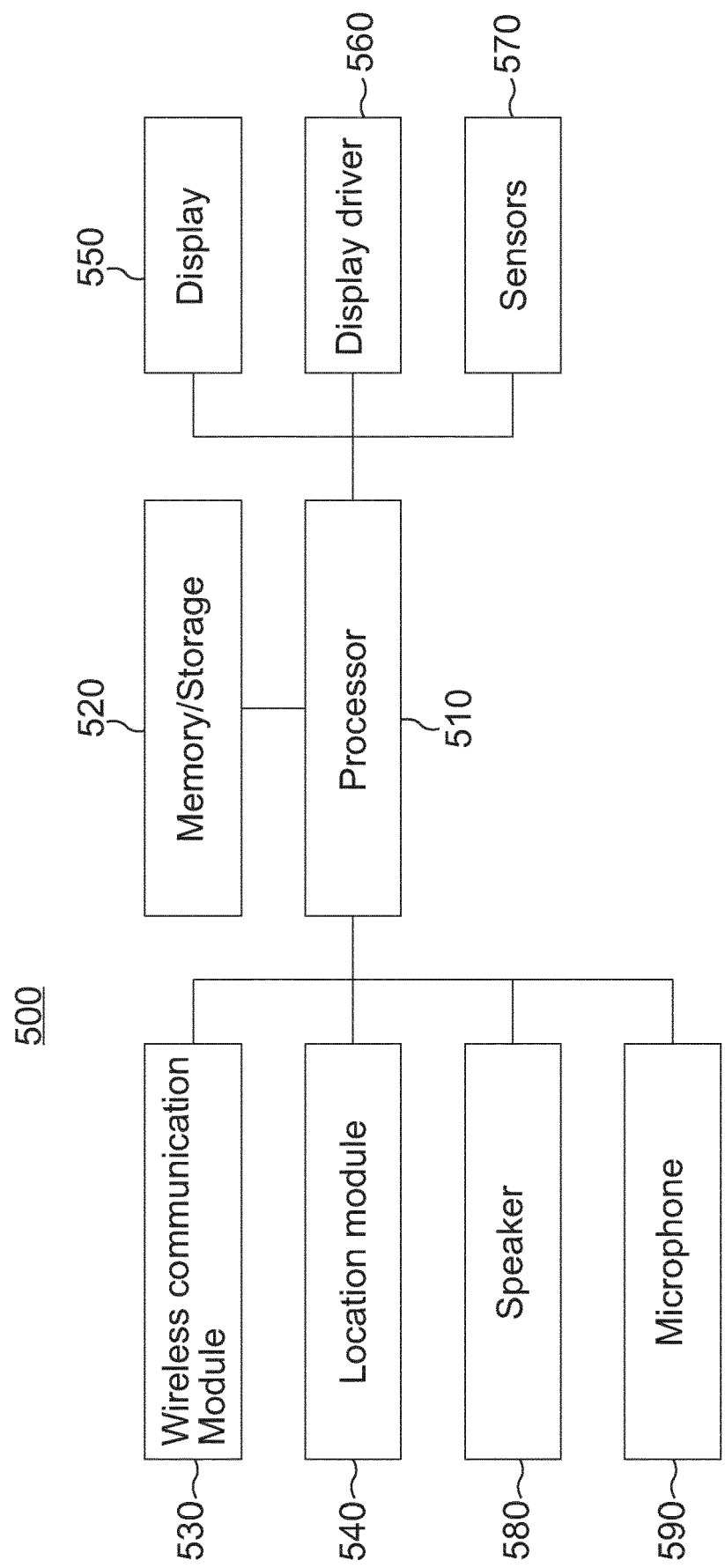
FIG. 5 is a block diagram of an example system for implementing the dialogue system in accordance with the examples disclosed herein.

FIG. 5 is a block diagram of an example system (or device) for implementing the dialogue system in accordance with the examples disclosed herein. The device 500 may be a mobile device. The device 500 includes a processor 510, a memory/storage 520, a wireless communication module 530 including a baseband module and a radio front end module (not shown), a location module 540, a display 550, a display driver 560, sensors 570, a speaker 570, a microphone 580, etc. In some aspects, the processor 510 may include, for example, one or more central processing unit (CPU) cores and one or more of cache memory. The wireless communication module 530 may support wireless communication of the device 500 in accordance with any wireless communication protocols, such as Third Generation (3G), Fourth Generation (4G), Fifth Generation (5G), WiFi, Bluetooth, or any wireless communication standards. Additionally, the device may also include a wired communication module. The memory/storage 520 may store codes or data such as user profile data, etc. The sensors 570 are included for sensing various activities of the user. For example, the sensors 570 may include an accelerometer, a gyroscope, etc.

The location module 540 may detect the location, such Global Positioning System (GPS) location, of the device 500.

The memory 520 (i.e. a machine-readable storage medium) stores codes to be executed by the processor 510. The codes, if executed, are configured to receive a request from a user, extract semantics of the request including at least one of entities, intent, or context of the request, select a sequence of action features based on the extracted semantics, and execute a sequence of machine services corresponding to the sequence of action features. The codes, if executed, may be configured to optimize the sequence of action features based on user configuration. The codes, if executed, may be configured to convert speeches and responses into features, organize features of the speeches and corresponding responses as an input sequence-to-target sequence pair, and perform supervised sequence-to-sequence training to train and optimize parameters of the recurrent neural network.

The examples disclosed herein provide a novel technical solution to model a richer semantic-understanding mapping between user intents and available services, that will be greatly improving user experience in the spoken dialogue system, as core of personal assistant. The examples can improve user experience in personal assistant so that the user can feel communication with human, rather machine, as the dialog system can serve with human semantics, rather API by API defined for machine by developers. The performance can be optimized as the mapping is learnt directly from human semantics with service API, rather via human defined semantics units. The examples disclosed herein may be applied to other applications for mapping directly human semantics with machine services.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A dialog system, comprising:
at least one processor of at least one user device configured to:
receive a request from a user;
extract semantics of the request including at least one of entities, intent, or context of the request;
select, with a recurrent neural network (RNN), a sequence of application programming interface (API) calls based on the extracted semantics that are provided as an input to the RNN, the selected sequence of API calls comprising at least a first API call for a first machine service and a second API call for a second machine service different from the first machine service, wherein the sequence of API calls maps a response output of the first API call to an input of the second API call;
execute the sequence of API calls; and
execute a vehicle communications API call including mapping at least a response output of the second API call to an input of the vehicle communications API call, wherein the vehicle communications API call sends at least the response output of the second API call to a vehicle that is different from the at least one user device.

2. The dialog system of claim 1, wherein the at least one processor is further configured to:
optimize the sequence of API calls selected with the RNN based on user configuration, wherein the optimization includes replacing at least one of the first or second API calls for at least one of the first or second machine services within the sequence of API calls selected with the RNN with a different API call for a different machine service based on the user configuration.

3. The dialog system of claim 2, wherein the at least one processor is further configured to:
optimize the sequence of API calls selected with the RNN by replacing at least one of the first or second API calls for at least one of the first or second machine services within the sequence of API calls selected with the RNN with a different API call for a different machine service based on the user configuration.

4. The dialog system of claim 1, wherein the request is a voice request, and wherein the at least one processor is configured to implement a voice recognition feature to convert a voice request to a text string.

5. The dialog system of claim 1, wherein the request is received as a text request.

6. The dialog system of claim 1, wherein the sequence of API calls is organized as a resource graph.

7. The dialog system of claim 1, wherein the recurrent neural network is trained by converting speeches and responses into features, organizing the features of the speeches and corresponding responses as an input sequence-to-target sequence pair, wherein the corresponding responses comprise sequences of API calls, and performing supervised sequence-to-sequence training to train and optimize parameters of the recurrent neural network.

8. The dialog system of claim 1, wherein the at least one processor is configured to call at least the first API and the second API in response to the request.

9. A method of implementing a dialog system, the method comprising:
receiving a request from a user at a user device;
extracting semantics of the request including at least one of entities, intent, or context of the request;
selecting, with a recurrent neural network (RNN), a sequence of application programming interface (API) calls based on the extracted semantics that are provided as an input to the RNN, the selected sequence of API calls comprising at least a first API call for a first machine service and a second API call for a second machine service different from the first machine service, wherein the sequence of API calls maps a response output of the first API call to an input of the second API call;
executing the sequence of API calls according to the sequence of action features; and
executing a vehicle communications API call including mapping at least a response output of the second API call to an input of the vehicle communications API call, wherein the vehicle communications API call sends at least the response output of the second API call to a vehicle that is different from the user device.

10. The method of claim 9, further comprising:
optimizing the sequence of API calls selected with the RNN based on user configuration.

11. The method of claim 10,
wherein optimizing includes replacing at least one of the first or second API calls for at least one of the first or second machine services within the sequence of API calls selected with the RNN with a different API call for a different machine service based on the user configuration.

12. The method of claim 9, wherein the request is a voice request, and the voice request is converted to a text string.

13. The method of claim 9, wherein the request is received as a text request.

14. The method of claim 9, wherein the sequence of API calls is organized as a resource graph.

15. The method of claim 9, wherein the recurrent neural network is trained by:
converting speeches and responses into features;
organizing the features of the speeches and corresponding responses as an input sequence-to-target sequence pair, wherein the corresponding responses comprise sequences of API calls; and
performing supervised sequence-to-sequence training to train and optimize parameters of the recurrent neural network.

16. The method of claim 9, further comprising calling at least the first API and the second API in response to the request.

17. The method of claim 9, wherein the response output of the second API call comprises a location, and wherein the vehicle communications API call sends the location to a navigation system of the vehicle.

18. The method of claim 17, wherein the first machine service determines a travel route and the response output of the first API call is the travel route, and
wherein the second machine service determines a location along a route and the response output of the second API call is the location.

19. A non-transitory machine-readable storage including machine readable instructions which, when executed, implement a method as in claim 9.

\* \* \* \* \*